United States Patent Office 3,310,428
Patented Mar. 21, 1967

3,310,428
COMPOSITE WITH LINEAR, RANDOM ACID
HALIDE COPOLYMER COATING
Daniel Edwin Maloney, Wilmington, Del., assignor to
E. I. du Pont de Nemours and Company, Wilmington,
Del., a corporation of Delaware
No Drawing. Filed Jan. 29, 1963, Ser. No. 254,592
8 Claims. (Cl. 117—118)

The present invention relates to novel acid halide copolymer composites, and, more particularly, to fabricated articles having surfaces treated with acid halide polymers.

The present invention is concerned with improving the properties of such articles as films and fabrics by imparting thereto properties not heretofore possessed by such articles without detracting from the basic advantageous properties of such articles. In particular, the invention is concerned with improving the properties of films and fabrics of natural polymeric materials by imparting thereto a coating of an acid halide copolymer which improves many of the properties deficient in the natural polymeric materials without adversely affecting the basic physical properties of these materials.

In accordance with the present invention, improved shaped structures are formed by treating a shaped polymeric substrate containing basic groups selected from the class consisting of groups having the formula —COH, —CNH$_2$ and —C—NH—C—, with a substantially linear addition polymer of an ethylenically unsaturated monomer containing at least 0.1 mole percent of acid halide group containing monomers to form a coating of the said acid halide polymer on said substrate, and curing the resulting composite to react at least 0.1 mole percent of the said acid halide group containing polymers through the acid halide group with the substance to form linkages selected from the class consisting of ester and amide linkages.

The acid halide polymers employed to prepare the composite structures of the present invention, hereinafter also defined as "surligomers," are addition polymers of ethylenically unsaturated monomers containing a carboxylic acid halide group or ethylenically unsaturated monomers copolymerized with ethylenically unsaturated carboxylic acid halides. The particular type of polymer employed to form the surligomer will depend on the modification of the shaped article desired, since the formation of the surligomer is not dependent on the nature of the acid halide polymer. Since the formation of the surligomer results through the reaction of the acid halide containing copolymer with the basic-group containing substrate, the presence of a basic group in the acid halide polymer will interfere in the formation of the surligomer. As a matter of fact, polymeric materials which contain groups which react with the acid halide groups of the polymer are excluded from the acid halide polymer component of the surligomer by virtue of the fact that such polymers react with themselves to form a crosslinked, insoluble, intractible material which can not be applied to form a coating and, thus, a surligomer. The acid halide polymer component employed in the formation of surligomers must contain at least one acid halide group per molecule. For practical purposes, the concentration of the acid halide monomer in the polymer should be at least 0.1 mole percent of the polymerized monomer units. It is also necessary that the acid halide polymer be a substantially linear polymer in order to allow the formation of coalesced continuous coatings on the substrate. In general, it is necessary to employ soluble polymers for the purposes of forming the required continuous coatings on the substrate and apply the acid halide polymer from a solution of an inert solvent. However, those polymers which form continuous coatings from colloidal dispersions can, of course, be employed in the form of colloidal dispersions. Similarly, those polymers which can be made to coalesce during the curing cycle can be applied in the form of aqueous dispersions. However, as a general rule, more uniform and thinner coatings are obtained if the acid halide polymer is deposited on the substrate from a solution. The solubility of the acid halide copolymer in the selected solvent should be sufficiently large enough to form a coating on the substrate. Since even very dilute concentrations, such as containing 0.1 weight percent, result in the deposition of a coating sufficient to give rise to surligomers, the solubility of the polymer in the selected solvent need not be high. In general, however, polymer concentrations in excess of one percent by weight of the solvent are preferred. Since the surligomer derives its properties from both the substrate as well as the coating, the acid halide polymers employed in the present invention should be of high molecular weight to derive the maximum improvement resulting from the solid state properties of the acid halide copolymer. Thus, the polymeric acid halide should be a solid at the use temperatures of the surligomer, which generally is below 50° C. The degree of polymerization of the acid halide polymer should, therefore, be at least 75 to 100. As indicated above, the acid halide polymer component of the surligomer may contain functional monomers, but such functional monomers must be inert towards the acid halide group.

The acid halide copolymers suitable as surligomer components are obtained by the halogenation of the corresponding acid copolymers using a phosphorus pentahalide which is passed through a solution of the acid polymer. Other methods employed in the formation of the acid halide copolymer are described in copending application, Serial No. 254,567, filed simultaneously herewith. It is to be pointed out that the direct polymerization of ethylenically unsaturated acid halides does not result in the formation of polymeric materials which are suitable in the formation of surligomers.

The acid halide groups in the polymeric coating component of the surligomer are obtained by the polymerization of an $\alpha,\beta$-ethylenically unsaturated acid containing preferably from 3 to 8 carbon atoms which is then halogenated. Examples of such acids are acrylic acid, methacrylic acid, itaconic acid, maleic acid, crotonic acid, fumaric acid, glutaconic acid and cinnamic acid. In the case of the polycarboxylic acids, one of the acid groups can be esterified. The carboxylic acid group containing monomers may be homopolymerized or copolymerized. It is to be realized, however, that the homopolymers of the ethylenically unsaturated acids on halogenation may be completely halogenated to become acid halide polymers or partially halogenated to be in effect copolymers of the acid and the acid halide. It is, of course, only necessary that sufficient acid groups be halogenated to cause reaction with the substrate. In this connection, it is to be noted that acid group or acid anhydride group containing polymers do not react with the substrates here employed to form surligomer. It is essential in order to cause the formation of the surligomer that the polymeric component contain the acid halide group. Although the acid halide may be a chloride, a bromide, a fluoride or an iodide, it is preferred to employ the chloride because the chlorination reaction of the acid copolymer is readily achieved and controlled, because the reaction with the substrate proceeds smoothly, and because the chloride is the most economic to use. It will, of course, be recognized that with respect to the surligomer itself, the halogen is not material, since it is eliminated during the formation of the surligomer, unless there is a large excess of acid halide groups.

The defined ethylenically unsaturated acids can also be copolymerized with ethylenically unsaturated monomers to give rise to acid polymers which can, in turn, be converted to the acid halide copolymer as indicated above.

The acid halide copolymers derivable through halogenation of the corresponding carboxylic acid copolymers include the copolymers of the said carboxylic acids with ethylenically unsaturated monomers having the general formula

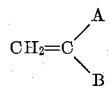

where A is a hydrogen or hydrocarbon group, such as an alkyl group or an aromatic group, a halogen, such as chlorine or bromine, a carboalkoxy group such that the monomer is an acrylate or methacrylate, an acyloxy group, such that the monomer is a vinyl ester, and ether group, such as an alkoxy group, a nitrile group, or an aldehyde group, such that the monomer is an acrolein or a substituted acrolein; and where B is a hydrogen, methyl or a halogen group. The formation of the surligomers is, however, not limited to acid halide group containing polymers derived from copolymers of the aforesaid monomers with ethylenically unsaturated acids, but as has already been indicated, can be extended to all types of acid halide copolymers which contain no functional groups reacting with the acid halide group.

The preparation of the copolymers from which the acid halide copolymers are derived is well known in the literature and is for that reason not described in detail here. In general, the polymers are formed by direct copolymerization of the monomers employing a free radical catalyst, such as a peroxide, or Friedel-Crafts and related ionic catalysts. The polymerization is generally carried out in the presence of an inert solvent, such as a liquid hydrocarbon or water, but may also be carried out in bulk when the monomers are liquid at reaction conditions.

Of particular interest in the formation of the surligomers of the present invention are hydrocarbon polymers containing halide groups. Such hydrocarbon polymers when coated on hydroxyl or amine group containing substrates by the process of the present invention result is surligomers which exhibit the highest degree of improvement in properties related to the surface of the substrate with the smallest loss in those properties relating to the bulk of the substrate. Thus, surligomers prepared from hydrocarbon polymers impart a high degree of water repellancy, shrink resistance and abrasion resistance and chemical inertness to the substrate, and yet the presence of the coating can not be detected by touch or appearance. Since the hydrocarbon polymers greatly improve many of the properties in which substrates containing hydroxyl or amine groups are deficient, particularly chemical properties related to the surface, without changing the appearance or "hand" of the substrate, they are greatly preferred in forming the surligomers of the present invention.

The preferred hydrocarbon polymers employed in the formation of surligomers are copolymers of olefins having the formula R—CH=CH$_2$, where R is either a hydrogen or an alkyl or aryl radical of preferably 1 to 8 carbon atoms with the acid halides of the described carboxylic acids. Thus, suitable olefins include ethylene, propylene, butene-1, pentene-1, hexene-1, heptene-1, 3-methylbutene-1, 4-methylpentene-1, styrene, etc. Although polymers of olefins having higher carbon numbers can be employed in the present invention, they are not materials which are readily obtained or available. The concentration of the olefin should be at least 50 mole percent in the copolymer and is preferably greater than 80 mole percent. As indicated above, the concentration of the acid halide comonomer in the polymer should be at least 0.1 mole percent and can be as high as 50 mole percent. However, the preferred concentration of the acid halide comonomer in the copolymer is from 0.2 to 20 mole percent.

The acid copolymers employed in forming the acid halide copolymers used to prepare the surligomer are produced in several ways. Thus, the copolymers may be obtained by the copolymerization of a mixture of the olefin and the carboxylic acid monomer. This method is preferred for the copolymers of ethylene employed in the present invention. Methods employed for the preparation of ethylene carboxylic acid copolymers have been described in the literature. In a preferred process, a mixture of the two monomers is introduced into a polymerization environment maintained at high pressures, 50 to 3000 atmospheres, and elevated temperatures, 150 to 300° C., together with a free radical polymerization initiator such as a peroxide. An inert solvent for the system, such as water or benzene, may be employed, or the polymerization may be substantially a bulk polymerization.

The formation of the polymer coating component, however, is not limited to copolymers obtained by direct copolymerization of an α-olefin with an α,β-ethylenically unsaturated carboxylic acid comonomer and thereafter halogeneated to form the acid halide copolymer. The acid halide copolymer may also be derived from copolymers obtained by the grafting of the acid comonomer to a polyolefin base. Such graft copolymers are generally obtained by exposing a solution or finely divided powder of the polyolefin to ionizing radiation in the presence of the carboxylic acid comonomer. In another method, the polyolefin in solution or in a finely divided form is contacted with a solution of the acid and a peroxide. Graft copolymerization has been described in great detail in the literature and is for that reason not further detailed. These techniques are preferably employed with polyolefins obtained from olefins of higher molecular weight than ethylene, such as propylene, butene-1, etc., since these latter monomers do not readily lend themselves to the direct copolymerization with the acid comonomer, although polymers of ethylene can, of course, also be prepared in this manner. Copolymers of α-olefins with carboxylic acids may also be prepared by copolymerization of the olefin with an α,β-ethylenically unsaturated carboxylic acid derivative which subsequently or during copolymerization is reacted either completely or in part to form the free acid. Thus, hydrolysis, saponification or pyrolysis may be employed to form an acid copolymer from an ester copolymer. It is to be pointed out that random copolymers consitute the preferred class of coating copolymers, since they allow a more even bonding of the coating materials to the substrate.

The copolymers employed in the present invention are preferably of high molecular weight in order to achieve the outstanding improvement in properties when applied to a substrate. The molecular weight of the hydrocarbon acid halide copolymer is most suitably defined by melt index, a measure of melt viscosity, described in detail in ASTM-D-1238-57T. The melt index of the copolymers employed in the formation of surligomers is preferably in the range of 0.1 to 1000 g./10 min., and, more particularly, in the range of 1.0 to 100 g./10 min.

The acid halide copolymer need not necessarily comprise a two component polymer. Thus, although the olefin content of the copolymer should be at least 50 mole percent, more than one olefin can be employed to provide the hydrocarbon nature of the copolymer. Additionally, any inert copolymerizable monomer can be employed in combination with the olefine and the carboxylic acid halide, the term "inert" being used to define monomers which do not react with the acid halide. The scope of acid copolymers suitable for conversion to surligomers is illustrated by the following examples: Ethylene/acrylic acid copolymers, ethylene/methacrylic acid copolymers, ethylene/itaconic acid copolymers, ethylene/ methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid vinyl formate copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, ethylene/chlorotrifluoroethylene/methacrylic acid copolymers, polyethylene/acrylic acid graft copolymers, polyethylene/methacrylic acid graft copolymers, polymerized ethylene/propylene acrylic acid graft copolymers, polymerized ethylene/butene-1 methacrylic acid graft copolymers, polymerized ethylene/vinyl acetate methacrylic acid graft copolymers, polypropylene/acrylic acid graft copolymers, polypropylene/methacrylic acid graft copolymers, polybutene/acrylic acid graft copolymers, poly-3-methylbutene/acrylic acid graft copolymers and polyethylene/acrylic acid/ethyl acrylate graft copolymers.

The surligomer is formed by the application of the acid halide polymer to a polymeric substrate which contains reactive groups selected from the class consisting of group having formulas

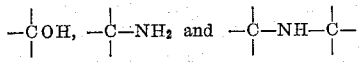

and the subsequent reaction of the basic group with the acid halide group of coating materials. It will be apparent that the polymeric substrates employed in the present invention comprise polymeric materials containing alcoholic hydroxyl groups, primary and secondary amine groups and amide groups. A relatively large class of materials containing these functional groups are naturally occurring polymeric materials, particularly glucose polymers and α-amino acid polymers. The improvement in properties resulting from the transforming such cellulosic and proteinaceous substrates into surligomers is particularly outstanding. Since known chemical modifications of cellulose do not remove all of the hydroxyl groups from the polymer molecule, surligomers may also be formed from cellulose derivatives. Thus, the present invention is applicable to cellulose, regenerated cellulose, cellulose ethers, cellulose esters and otherwise modified cellulose. Surligomers formed from fibrillar proteins show a similar improvement in properties and, thus, give rise to highly attractive products. The present invention is particularly applicable to such proteinaceous polymers as wool and other types of hair, leather and silk.

The formation of surligomers is, however, in no way limited to natural polymeric substrates containing the described functional groups, but is further applicable to all synthetic polymeric substrates which contain the necessary functional groups. Thus surligomers may be formed with such synthetic polymer substrates as polyamides and polyesters.

The coating of the acid halide polymer is applied to shaped articles which retain their surface in subsequent fabrication, if any. This, however, is not to indicate that the coating is applied only to the finished article, but it is clear that the coating can be applied to an intermediate shaped structure if the structure is maintained in the finished article. Thus, surligomers can be formed with paper pulps which comprise short cellulosic fibers and the resulting surligomers can then be fabricated into paper, boxboard, cardboard, wall board and other molded paper articles of all kinds. On the other hand, it is, of course, possible to also impregnate the finished article, such as the paper, to form surligomers on only the surface of the paper or similar article. Similarly it is possible to treat either a fiber or a woven or non-woven fabric. In addition to forming surligomers with either fiber or fabrics, surligomers may also be formed by coating continuous substrates, such as films or sheets. Particularly outstanding surligomers may be obtained by coating such films as cellophane, cellulose ester films and polyester films.

The surligomers of the present invention are formed by applying a coating of the acid halide polymer to the polymeric substrate and subsequently curing the composite to effect bonding between the coating and the substrate. The coating procedures employed are in line with the standard coating or impregnating procedures developed in the art. Thus, a solution or a colloidal dispersion of the acid halide polymer in an inert, preferably volatile, solvent may be sprayed, painted or exhausted onto the substrate or the substrate may be dipped into a solution of the acid halide polymer or passed through such a solution. Other methods will be apparent to those skilled in the art. The thickness of the coating can be controlled by the concentration of the solution or dispersion and the contact time of the substrate with the solution or dispersion, i.e., the pickup of the solution by the substrate, and depends in part also on the absorptivity of the substrate. From an industrial standpoint, it is, of course, desirable to employ short contact times and, hence, it is desirable to employ high concentrations. In general, a monomolecular layer of the acid polymer on the substrate gives rise to surligomers having greatly improved properties. However, if desired, thicker coatings up to several mils may be applied. The coating of the substrate is followed by the removal of the solvent and the curing of the composite. In many instances, the volatility or the ease of removal of the solvent will dictate the choice of the particular solvent employed.

The removal of the solvent and the curing of the composite results in covalent links between the substrate and the coating are formed through the reaction of the acid halide group in the coating polymer and the basic groups in the substrate resulting in the release of hydrogen halide. The curing results in covalent bonds between the coating and the substrate making the former an integral and permanent part of the latter. Since the hydrogen halide is gaseous at normal temperatures and will escape from the composite, and since the reactivity of the groups involved in forming the covalent links is high, the reaction can be carried out over a wide range of temperatures ranging from above the condensation temperatures of the hydrogen halide up to the decomposition temperatures of either component of the composite. However, it will be apparent that the reaction rate is temperature dependent and that therefore rapid reaction and curing can be accomplished by the use of elevated temperatures. It is, therefore, preferable to employ temperatures in the range of 50 to 150° C. in order to have short cure cycles.

The curing is generally carried out in an environment providing for the removal of the hydrogen halide formed. The evolution of the hydrogen halide, furthermore, provides a measure of the rate and degree of reaction. It is not essential that every acid halide group in the polymer is reacted with a reactive group of the substrate. In general, it is only necessary that at least one acid halide group per molecule reacts with the substrate. Generally, this is achieved if at least 0.1 mole percent of the monomeric groups of the coating polymer have been reacted with the substrate.

The resulting surligomer comprises a composite of a shaped polymeric material having permanently and integrally bonded thereto a thin, preferably only a few molecular layer thick, coating. This coating is sufficient to impart a significant portion of the chemical surface properties of the coating to the shaped polymeric material without affecting the overall mechanical and other physical properties of the substrate insofar as they are not dependent on the chemical properties of the surface. Thus, it is possible to drastically alter the properties of the substrate with respect to permeability, chemical inertness, adhesiveness, dyeability, abrasion resistance, antistatic properties and similar properties by the choice of the proper acid halide polymer. Since only a very thin coating of the acid halide copolymer is necessary, the surligomer does not differ in touch or appearance from the untreated base which is of significant importance in fabrics. The surligomers, furthermore, do not affect the breathability of a fabric and fabrics treated by the process of the present invention with hydrocarbon polymers remain porous.

In view of the outstanding chemical surface properties of hydrocarbon polymers, such as moisture resistance, abrasion resistance, resistance to chemicals, fungus and bacteria attack, properties in which the cellulosic and proteinaceous polymers are deficient, surligomers formed from these two components show remarkable improvement in chemical properties with no measurable deterioration of the mechanical properties of the substrate. The formation of surligomers, furthermore, may be used to seal in effects caused by treatments of the substrate, such as dyes, inks and printing, thereby preventing fading, wash-out, bleaching and wicking.

The invention is further illustrated by the following examples showing the formation of surligomers from various polymeric materials containing the defined reactive groups with acid halide polymers. Unless otherwise stated, the acid halide copolymers employed in these examples were prepared by reaction of the corresponding acid copolymer with a phosphorus pentahalide employing a solution or dispersion of the polymer in tetrachloroethylene. Unless otherwise indicated, the numbers showing the ratio of comonomers in the acid halide copolymer is a weight ratio. The polymeric acid halides employed in the examples generally had molecular weights in the range corresponding to melt indices of 1 to 100 g./10 min., as measured by ASTM D-1238-57T.

*Examples I to VI*

Five grams of the acid chloride containing copolymer shown in Table I is dissolved in 200 cc. of toluene at 80 to 90° C. The solution was padded onto the wool fabric (blue flannel, 6.4 oz./yd., 40 picks and 24 ends/inch) by immersing the fabric in the solution and passing it between squeeze rolls so that pick up of solution was 150 to 200% of the fabric weight. The samples are then air dried followed by 1 hour cure at 110° C. The curing time can be reduced to 15 minutes without significant change. Samples were then washed according to the AATCC procedure 99-1960T for felting shrinkage (75 min. at 100° F., etc.). The shrinkage data are reported in Table I.

TABLE I

| Ex. | Copolymer | Composition in weight percent | Weight percent Add-On | Percent Shrinkage (Area) |
| --- | --- | --- | --- | --- |
| I | Control | | | [1] 36 |
| II | Ethylene-methacrylyl chloride | 97/3 | 3.5 | [2] 0 |
| III | do | 97/3 | 1.6 | 1.5 |
| IV | Ethylene-vinyl-acetate-methacrylyl chloride | 76/20/4 | 5 | 0 |
| V | Styrene-methacrylyl chloride | 90/10 | 5 | 5 |
| VI | Methyl methacrylate methacrylyl chloride | 82/18 | 4.3 | 6.4 |

[1] Avg. of 3.
[2] This sample was washed ten times.

*Examples VII to XV*

Following the procedure of Examples I to VI, black flannel is coated, cured and tested, employing the copolymers listed in Table II. The results obtained are illustrated in Table II.

TABLE II

| Ex. | Copolymer | Composition in weight percent | Weight percent Add-On | Percent Shrinkage (Area) |
| --- | --- | --- | --- | --- |
| VII | Control | | | 17 |
| VIII | Chlorinated ethylene-methacrylyl chloride | [1] 91/9 | 4.1 | 0 |
| IX | High density polyethylene-methacrylyl chloride graft copolymer | 98/2 | 4 | 12 |
| X | Ethylene-ethyl acrylate acrylyl chloride | 70/24/6 | 1.6 | 8 |
| XI | Ethylene-itaconyl chloride | 94/6 | 4 | 10 |
| XII | Ethylene-maleyl chloride | 97/3 | 4 | 3.5 |
| XIII | Vinylidene chloride-acrylonitrile itaconyl chloride | 90/9/1 | 4 | 9.5 |
| XIV | Styrene-butadiene-methacrylyl chloride | 44/53/3 | 1 | 10 |
| XV | Methyl vinyl ethermaleic acid maleyl chloride copolymer | 31/42/27 | 3 | 12.5 |

[1] 17% chlorine.

*Examples XVI to XVIII*

Cotton poplin fabric is immersed in a solution containing ethylene methacylyl chloride (95/5) in xylene (10 g./300 cc.) at about 60° C. Pyridine (1 gm.) is added to take up HCl formed. Immersion is continued for ¾ hour and then the sample is washed in xylene, air dried and cured at 110° C. The cloth is tested for water repellency by an immersion test (AATCC 21-52). Samples are immersed for 30 minutes, removed, and passed through squeeze rolls. Water pick up for the treated sample as well as a control and a sample treated with the ethylene-methacrylic acid base resin is shown in Table III. In addition, a measure of drying rate is also indicated by the amount of water remaining after ½ hr., and the water pick up after the samples were soaked in "Perclene."

TABLE III

| Ex. | | Water Pick Up, Percent | Residual Water after ½ hr. | Water Pick Up After Perclene, Percent |
| --- | --- | --- | --- | --- |
| XVI | Control | 46.5 | 7.3 | |
| XVII | Cotton and ethylene methacrylyl chloride copolymer | 16.3 | 0.8 | 14 |
| XVIII | Cotton and ethylene methacrylic acid copolymer | 26.5 | 0.7 | 34 |

The foregoing examples illustrate that, although a temporary improvement may be obtained by the use of the acid copolymer, no true surligomer is formed with the acid copolymer, since the acid copolymer is removed by a solvent for the acid copolymer. Although the solvent is an even better solvent for the acid halide copolymer, no adverse change in the cotton is observed, the acid halide copolymer being permanently bonded to the substrate.

*Example XIX*

Sheets of a polyamide film (66 nylon) are placed in a solution of an ethylene-methacrylyl chloride (90/10) copolymer in tetrachloroethylene at 80 to 90° C. for 30 minutes. After draining and air drying the polyamide film is cured at 110° C. in a vacuum oven. These films are then laminated to kraft paper in a press at 120° C. and about 1000 p.s.i.g. The resulting laminates have excellent cohesion. The polyamide film could not be removed from the paper without pulling the paper apart. Sheets of a polyamide film bonded directly to the paper without the described treatment could be readily separated.

*Examples XX to XXIV*

Unplasticized, uncoated cellophane film is immersed in a xylene solution of an ethylene methacrylyl chloride (97/3) copolymer, the concentration of the copolymer being 25 g./l., at 80 to 90° C. for 45 minutes. The film is washed with xylene to remove excess copolymer and cured at 100° C. for 45 minutes. Polyamide films (66/6 nylon copolymer) are treated similarly. Results of water permeability studies, using Thwing-Albert Cups at 73° F., 50% R.H., are shown in Table IV.

TABLE IV.—WATER PERMEABILITY OF CELLOPHANE AND POLYAMIDE FILMS

| Ex. | Film | Coating | Permeability in g./m.²/hr./mil |
|---|---|---|---|
| XX | Cellophane | | 26.6 |
| XXI | do | Eth./methacrylyl chlor. copolymer (0.2 mil). | 13.4 |
| XXII | do | Eth./methacrylyl chlor. copolymer (0.8 mil). | 2.2 |
| XXIII | Polyamide | | 6.0 |
| XXIV | do | Ethylene/methacrylyl Chloride copolymer (0.45 mil). | 1.4 |

*Examples XXV to XXX*

Tire cords made of nylon and "Dacron" polyester are treated with an ethylene methacrylyl chloride copolymer by immersing the cords in a 2.8% xylene solution of the copolymer. The cords are then cured for 30 minutes at 110° C. The cords are evaluated for adhesion to ethylene/propylene/unconjugated diene rubber, available under the trademark "Nordel," using the "H" type pull tests. The results of the tests are shown in Table V.

TABLE V.—ADHESION OF NYLON AND DACRON POLYESTER TIRE CORDS TO "NORDEL" ETHYLENE PROPYLENE RUBBER

| Example | Cord | Coating | Percent Coating | H Pull in lbs. at room temperature |
|---|---|---|---|---|
| XXV | Nylon | | | 1-2 |
| XXVI | do | Ethylene/methacrylyl chloride copolymer (97/3). | 5.6 | 14.5 |
| XXVII | do | Ethylene/methacrylyl chloride copolymer (90/10). | 2.2 | 14.0 |
| XXVIII | do | do | 1.0 | 10.5 |
| XXIX | Dacron | | | 1-2 |
| XXX | do | Ethylene/methacrylyl chloride copolymer (90/10). | 1.4 | 4.5 |

*Examples XXXI to XXXII*

Nylon cloth is immersed in a solution of 15 g. of ethylene methacrylyl chloride copolymer (84/16) in 600 ml. of toluene, squeezed through rolls and then cured for 45 minutes at 110° C. The cloth is then immersed in a 50%–50% "Carbowax" 400-toluene solution at 90° C. for 1 hour. The cloth is squeezed out and cured at 110° C. for one hour. Samples are then thoroughly washed in acetone and dried. The "Carbowax" is absorbed by the modified cloth to the extent of about 1.5 to 1.8 weight percent. The cloth is washed again in tap water and the weight pick-up is reduced to 0.4 to 0.7%. Washing of unmodified cloth treated with "Carbowax" by the foregoing procedure removes substantially all of the "Carbowax" deposited. Using an antistatic charging and discharging decay measuring device, the rate of charge to 5000 volts and the time to discharge is measured. The cloth is again washed in water and retested. The results are shown in Table VI.

TABLE VI.—CHARGING AND DISCHARGING RATE OF MODIFIED NYLON CORD

| Example | Cord | Time to Charge to 5,000 v., in minutes | Time to Discharge from 5,000 to 500 v. | Time to Discharge after Washing |
|---|---|---|---|---|
| XXXI | Unmodified Nylon | 22.5 | 20 | 20 |
| XXXII | Treated Nylon | 1.9 | 1.4 | 0.15 |

*Example XXXIII*

A sample of leather (pearl grain goat skin), is immersed in a solution of 5 g. of an ethylene methacrylyl chloride copolymer (95/5) in 200 ml. of toluene for a period of 30 minutes. The sample is then squeezed through rolls and cured at 100° C. for 30 minutes. The leather absorbed 2 weight percent of the copolymer. A treated and an untreated sample is placed in a beaker of water. The untreated sample is wetted within 10 minutes and sinks to the bottom of the beaker, while the treated sample remained on top of the water and was not wet.

The foregoing examples illustrate the formation of the surligomers of the present invention and illustrate some of the improvements in properties obtained through surligomer formation. It is to be understood that the examples are not intended to encompass all of the methods of surligomer formation nor are they intended to illustrate all of the beneficial effects derivable from surligomer formation. The foregoing examples, however, clearly illustrate that the surligomers are formed by techniques well known in the art and that a wide scope of acid halide copolymers can be employed to form surligomers.

Surligomer formation finds utility in all situations in which it is desirable to modify the chemical properties of the surface without affecting the mechanical and bulk physical properties of the substrate. In particular, surligomer formation may be employed for purposes of shrink proofing, increasing water repellancy, decreasing moisture sensitivity, increasing abrasion resistance, increasing adhesion, strengthening of fabrics by improving the attraction of fibers to each other, which is particularly important in non-woven fabrics, increasing the dyeability, reducing wicking and increasing the chemical resistance of substrates. The presence of excess acid halide groups in the surligomer may also be further employed to beneficially alter the chemical properties of the surligomer through further reaction with compounds having reactive groups and imparting the desired property improvement. Thus, it is possible to permanently attach light stabilizers, antioxidants, antistatic agents or dyes by this method. As indicated above, surligomer formation is utilized primarily to vary the chemical properties of shaped articles, particularly fibers, fabrics, non-woven structures made from short fibers using paper making techniques, including all types of products made from cellulose pulp, and films, although surligomer formation is, of course, in no way limited to such shaped structures.

The foregoing description of surligomer formation has illustrated the broad applicability and utility of the present invention and it should be reemphasized that the present invention is applicable to all types of acid halide copolymers which are substantially linear, i.e., do not contain any crosslinks which would prevent the solubility or the ability of the copolymer to fuse into homogeneous structures. Such crosslinks are known to result in comonomers not "inert" to the acid halide group and, in particular, comonomers containing reactive hydroxyl, amine and amide groups. The surligomer substrate, on the other hand, requires the presence of these groups which are defined as basic groups using the Lewis acid/base concept, to result in covalent bonding between the substrate and the acid halide copolymer. Although the great majority of substrates employed in the formation of surligomers contain the indicated hydroxyl, amine or amide linkages, it is to be pointed out that other substrates, which basic groups in the sense of the Lewis acid/base concept, such as, for example, mercaptyl groups, can be employed to prepare surligomers. The concentration of these reactive groups on the substrate should be sufficient to cause the necessary degree of reaction indicated, which, as indicated above, is readily determined.

I claim:

1. A composite comprising a shaped polymeric substrate containing basic groups selected from the class consisting of groups having the formula —COH, —CNH$_2$, and —C—NH—C— and a coating on said substrate of a substantially linear random polymer having a melt index of 0.1 to 1000 g./10 min. containing at least 50 mole percent of an α-olefin having the general formula $$CH_2=CHR$$

wherein R is selected from the class consisting of hydrogen and hydrocarbon radical of 1 to 8 carbon atoms, and from 0.1 to 20 mole percent of an α,β-ethylenically unsaturated carboxylic acid halide of 3 to 8 carbon atoms, said random polymer being produced by halogenation of the corresponding acid polymer and any other units in the polymer being inert towards acid halide groups, in which at least 0.1 mole percent of the monomer of the coating polymer is reacted with the substrate through the acid halide group to form linkages selected from the class consisting of ester and amide linkages.

2. The composite of claim 1 wherein the α,β-ethylenically unsaturated carboxylic acid halide is a chloride.

3. The composite of claim 1 wherein the coating polymer is a copolymer of ethylene and 0.1 to 20 mole percent of an α,β-ethylenically unsaturated carboxylic acid chloride.

4. The composite of claim 1 wherein the substrate is a cotton substrate.

5. The composite of claim 1 wherein the substrate is a keratin polymer.

6. The composite of claim 1 wherein the substrate is a synthetic polyamide.

7. The composite of claim 1 wherein the substrate is cellophane.

8. The composite of claim 1 in which the polymer contains at least 80 mol percent α-olefin units.

References Cited by the Examiner

UNITED STATES PATENTS

| 2,440,090 | 4/1948 | Howk et al. | 260—84 |
| 2,646,425 | 7/1953 | Barry | 260—94.9 |
| 2,671,074 | 3/1954 | Brown | 260—80.7 |
| 2,780,608 | 2/1957 | Hurwitz et al. | 117—141 XR |
| 2,789,030 | 4/1957 | Fetscher | 8—120 |
| 3,021,269 | 2/1962 | Miller | 204—154 |
| 3,042,642 | 7/1962 | De Marco et al. | 117—138.8 XR |
| 3,083,118 | 3/1963 | Bridgeford | 117—47 |
| 3,093,441 | 6/1963 | Whitfield et al. | 117—141 XR |
| 3,107,969 | 10/1963 | Koenig | 8—128 |

FOREIGN PATENTS 213,942  3/1958  Australia.

OTHER REFERENCES

Hall et al., J. Appl. Pol. Sci. 2, 246–50 (1959).

Textile World, "Cotton Finishing: Where It Stands and What's Ahead," February 1962, pages 86–90.

WILLIAM D. MARTIN, *Primary Examiner.*

RICHARD D. NEVIUS, *Examiner.*

W. D. HERRICK, C. A. HAASE, *Assistant Examiners.*